United States Patent
Bessho

(10) Patent No.: US 7,609,337 B2
(45) Date of Patent: Oct. 27, 2009

(54) BACKLIGHT DEVICE COMPRISING A REFLECTOR COMPRISING A PROTRUDING PART PROVIDED IN A PORTION WHERE A HOLDING MEMBER IS ATTACHED AND LIQUID CRYSTAL DISPLAY DEVICE HAVING THE SAME

(75) Inventor: Hisanori Bessho, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 78 days.

(21) Appl. No.: 11/420,106

(22) Filed: May 24, 2006

(65) Prior Publication Data

US 2006/0268572 A1    Nov. 30, 2006

(30) Foreign Application Priority Data

May 30, 2005    (JP)    ............................. 2005-157582

(51) Int. Cl.
*G02F 1/1335*    (2006.01)
*G02F 1/13357*    (2006.01)
*F21V 7/04*    (2006.01)

(52) U.S. Cl. ............................. 349/65; 349/58; 349/60; 349/67; 349/70; 362/632; 362/634

(58) Field of Classification Search .................... 349/65
See application file for complete search history.

(56) References Cited

U.S. PATENT DOCUMENTS

| | | | | |
|---|---|---|---|---|
| 5,280,372 | A | * | 1/1994 | Horiuchi .......................... 349/65 |
| 5,788,356 | A | * | 8/1998 | Watai et al. .................. 362/621 |
| 5,808,708 | A | * | 9/1998 | Oyama et al. .................. 349/65 |
| 5,815,227 | A | | 9/1998 | Lee |
| 6,219,117 | B1 | * | 4/2001 | Nagakubo et al. ............. 349/65 |
| 6,811,276 | B2 | * | 11/2004 | Moon ......................... 362/600 |

(Continued)

FOREIGN PATENT DOCUMENTS

JP    07-287228 A    10/1995

(Continued)

OTHER PUBLICATIONS

Translation of the Official Communication issued in the counterpart Korean Application No. 10-2006-0047899, mailed on Aug. 31, 2007.

*Primary Examiner*—Andrew Schechter
*Assistant Examiner*—Charles Chang
(74) *Attorney, Agent, or Firm*—Keating & Bennett, LLP

(57) ABSTRACT

A backlight device is incorporated into a liquid crystal display device so as to illuminate a liquid crystal panel from a backside. The backlight device includes a light-guiding plate emitting a light, which is incident on a side surface thereof, from a front surface, and a reflector arranged along the side surface of the light-guiding plate so as to reflect a light from a light source accommodated inside thereof and guide the light to the side surface of the light-guiding plate through an opening part. A least one minute protruding part, which protrudes in a direction parallel to the side surface of said light-guiding plate, is formed on an edge part of the opening part of the reflector facing the light-guiding plate. The side surface of the light-guiding plate is brought into contact with the protruding part of the reflector when the light-guiding plate moves toward the reflector.

10 Claims, 8 Drawing Sheets

U.S. PATENT DOCUMENTS

| | | | |
|---|---|---|---|
| 6,960,891 B2 * | 11/2005 | Park et al. | 315/229 |
| 6,966,686 B2 * | 11/2005 | Chen | 362/634 |
| 2001/0010568 A1 * | 8/2001 | Nakano | 349/58 |
| 2001/0036068 A1 * | 11/2001 | Suzuki et al. | 362/31 |
| 2004/0190280 A1 * | 9/2004 | Matsushita | 362/31 |
| 2005/0162867 A1 * | 7/2005 | Sinofsky | 362/615 |

FOREIGN PATENT DOCUMENTS

| | | |
|---|---|---|
| JP | 8-235922 A | 9/1996 |
| JP | 09-189911 A | 7/1997 |
| JP | 2004-071298 A | 3/2004 |
| JP | 2005-55924 A | 3/2005 |
| KR | 2000-37845 A | 7/2000 |

* cited by examiner

BACKLIGHT DEVICE COMPRISING A REFLECTOR COMPRISING A PROTRUDING PART PROVIDED IN A PORTION WHERE A HOLDING MEMBER IS ATTACHED AND LIQUID CRYSTAL DISPLAY DEVICE HAVING THE SAME

BACKGROUND OF THE INVENTION

1. Field of the Invention

The present invention relates to backlight devices for backside illumination of liquid crystal display device and, more specifically, to an edge-light type backlight device which introduces a light from a side surface of a light-guiding plate made of a transparent plate.

2. Description of the Related Art

A liquid crystal panel of a liquid crystal display device performs a screen display by not emitting a light by itself but transmitting and interrupting a light by a polarization action. Therefore, generally, a backlight device, which illuminates a liquid crystal panel from a backside, is incorporated in a liquid crystal display device.

FIG. 1 is an exploded perspective view of a conventional backlight device. The conventional backlight device shown in FIG. 1 comprises reflectors 12, in which fluorescent tubes 11 or the like as a light source are accommodated and held, and a light-guiding plate 13 made of a transparent plate. The reflector 12 are located along side surfaces of the light-guiding plate 13 so as to reflect a light emitted from the fluorescent tubes 11 and introduce the light to the light-guiding plate 13. Each reflector 12 is generally formed of a metal plate in a channel shape, and arranged so that an opening part faces the side surface of the light-guiding plate 13. The light-guiding plate 13 is formed of, for example, a highly transparent PMMA resin, and has a thickness of about 10 mm.

A diffusion plate 14 is arranged on a light-emitting surface (a surface on a side where the liquid crystal panel is arranged) of the light-guiding plate 13. The diffusion plate 14 is formed, for example, of a polyester base resin, and a thickness thereof is about 0.1 mm. A reflection plate 15 is arranged on a backside opposite to the light-emitting surface of the light-guiding plate 13. The reflection plate 15 is formed of, for example, a polyester base resin.

The reflectors 12, the light-guiding plate 13, the diffusion plate 14, and the reflection plate 15 are accommodated in a backside cover 16, which is formed of, for example, an aluminum plate having a thickness of 0.8 mm. A frame 17 formed of an aluminum plate is provided over the diffusion plate 14. It should be noted that the fluorescent tubes 11 as a light source are held in the reflectors 12 by holding members 18 made of a silicon rubber having a thickness of 1.0 mm.

FIG. 2 is a plan view of the backlight device shown in FIG. 1. The periphery of the backlight device is covered by the frame 17, and the diffusion plate 14 is exposed inside the frame 17. A light introduced from the fluorescent tubes 11 into the light-guiding plate 13 is emitted from the diffusion plate 14 at a uniform illumination intensity. The liquid crystal panel is illuminated from the backside by this light.

FIG. 3 is an enlarged cross-sectional view taken along a line III-III in FIG. 2. As shown in FIG. 3, the light-guiding plate 13 is accommodated in the backside cover 16. The reflector 12 is arranged along and near the side surface of the light-guiding plate 13. The light-guiding plate 13 and the reflectors 12 are held in a state where they are sandwiched between the frame 17 and the backside cover 16.

According to the above-mentioned arrangement structure, if an air gap between the light-guiding plate and each reflector 12 is reduced due to a thermal expansion of the light-guiding plate 13 and when a shock is applied to the backlight device, it is possible that the light-guiding plate 13 contacts with the fluorescent tubes 11 in the reflectors 12. In a worst case, the fluorescent tubes 11, which are made of glass tubes, may be damaged due to the contact with the light-guiding plate 13.

In order to prevent such a problem, it is considered to form a structure in which an opening part of each reflector 12 facing the light-guiding plate 13 is made smaller than the side surface of the light-guiding plate 13. That is, a size of the opening part of the reflector 12 is set so that the light-guiding plate 13 does not contact with the fluorescent tubes 11 by bringing the light-guiding plate 13 into contact with a rim of the reflector 12.

Thus, there is suggested a structure to fix the reflector itself relative to the light-guiding plate. That is, a groove is formed on a surface of the light-guiding plate near the side surface thereof so as to couple the light-guiding plate and the reflector by bringing the rim of the reflector into engagement with the groove so as to maintain the positional relationship between the light-guiding plate and the reflector always constant (for example, refer to Patent Document 1). Alternatively, a step is made on an end part of the reflector facing the light-guiding plate so as to form a structure in which the reflector covers the light-guiding plate over the portion of the step.

Patent Document 1: Japanese Laid-Open Patent Application No. 7-287228

Patent Document 2: Japanese Laid-Open Patent Application No. 9-189911

As mentioned above, according to the structure which maintains a distance between the reflector and the light-guiding plate constant by bringing the reflector and the light-guiding plate into engagement with each other, there is no possibility that the light-guiding plate contacts with the fluorescent tubes in the reflector, which can prevent the fluorescent tubes from damaging.

However, if such a structure is made, an area of the opening part, through which the light introduced from the reflector into the light-guiding plate passes, is reduced, which may generate a problem that a luminance is greatly reduced. That is, in the structure disclosed in Patent Document 1, since the groove is formed on the light-guiding plate so as to insert a rim of the reflector into the groove, an area of the light-guiding plate through which a light passes is reduced due to the groove, which results in a reduction in the luminance. Additionally, also in the structure disclosed in Patent Document D2, the area of the opening part is reduced by an area corresponding to the steps provided on the end part of the reflector, which results in a reduction in the luminance.

SUMMARY OF THE INVENTION

It is a general object of the present invention to provide an improved and useful backlight device in which the above-mentioned problems are eliminated.

A more specific object of the present invention is to provide a backlight device having a structure in which a light-guiding plate cannot enter inside a reflector while acquiring an opening area sufficient to the light-guiding plate.

In order to achieve the above-mentioned object, there is provided according to one aspect of the present invention a backlight device configured to be incorporated into a liquid crystal display device, comprising: a light-guiding plate emitting a light, which is incident on a side surface thereof, from a front surface; and a reflector arranged along the side surface of the light-guiding plate so as to reflect a light from a light source accommodated inside thereof and guide the light to the side surface of the light-guiding plate through an opening part, wherein at least one minute protruding part, which protrudes in a direction parallel to the side surface of said light-guiding plate, is formed on an edge part of the opening part of the reflector facing the light-guiding plate; and the side surface of the light-guiding plate is brought into contact with the protruding part of the reflector when the light-guiding plate moves toward the reflector.

In the above-mentioned backlight device, the reflector is preferably formed of a metal plate, and the protruding part is preferably formed by deforming the metal plate. Additionally, the reflector may have a holding member for fixing the light source, and the protruding member may be provided in a portion where the holding member is attached and the protruding member may be in contact with the holding member. Further, a coat may be applied on a surface of said protruding part facing said light-guiding plate, the coat having a coefficient of friction smaller than that of the reflector.

Additionally, there is provided according to another aspect of the present invention a liquid crystal display device comprising the above-mentioned backlight device and a liquid crystal panel arranged on the backlight device.

According to the above-mentioned present invention, the protruding part formed on the reflector serves as a stopper so that the side surface of the light-guiding plate contacts with the protruding part and cannot enter further inside the reflector when the light-guiding plate moves toward the reflector. Therefore, the light-guiding plate never contact with the light source retained inside the reflector, thereby preventing the light source from being damaged.

Moreover, a contact area between the reflector and the retaining member is increased by forming the protruding part at a position where the light source is brought into contact with the retaining member of the light source, and, thus, heat is released through the reflector and a cooling effect to cool the light source can be raised.

Other objects, features and advantages of the present invention will become more apparent from the following detailed description when read in conjunction with the accompanying drawings.

DETAILED DESCRIPTION OF THE PREFERRED EMBODIMENTS

Next, a description will be given, with reference to the drawings, of embodiments of the present invention.

Figure 4:
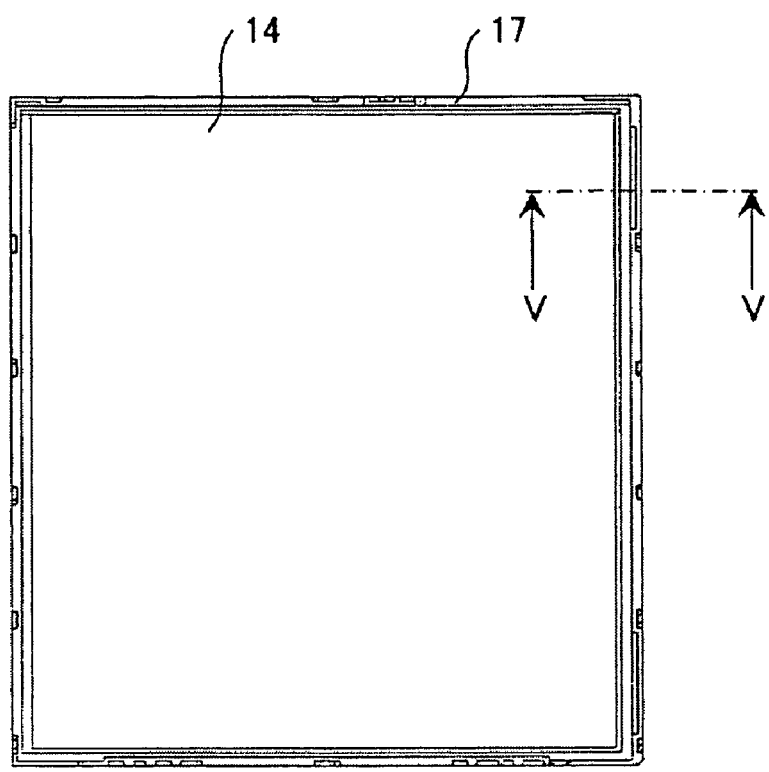
FIG. 4 is a plan view of a backlight device according to a first embodiment of the present invention.
Figure 5:
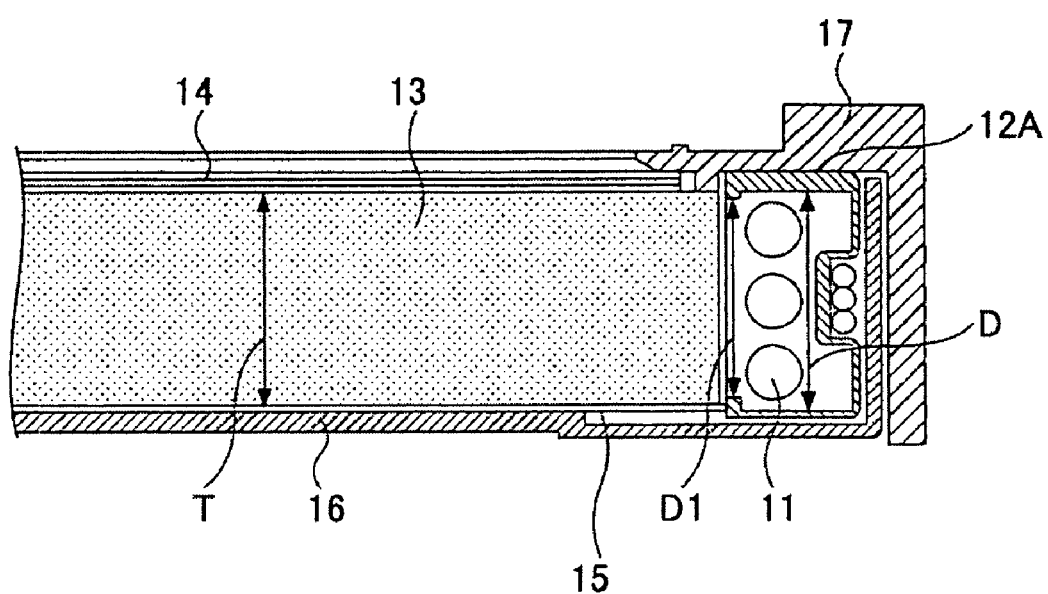
FIG. 5 is an enlarged cross-sectional view taken along a line V-V in FIG. 4.

FIG. 4 is a plan view of a backlight device according to a first embodiment of the present invention. FIG. 5 is an enlarged cross-sectional view taken along a line V-V in FIG. 4. Since the backlight device according to the first embodiment of the present invention has the same fundamental structure as the backlight device shown in FIG. 1, parts that are the same as the parts shown in FIG. 1 are given the same reference numerals, and descriptions thereof will be omitted.

Figure 1:
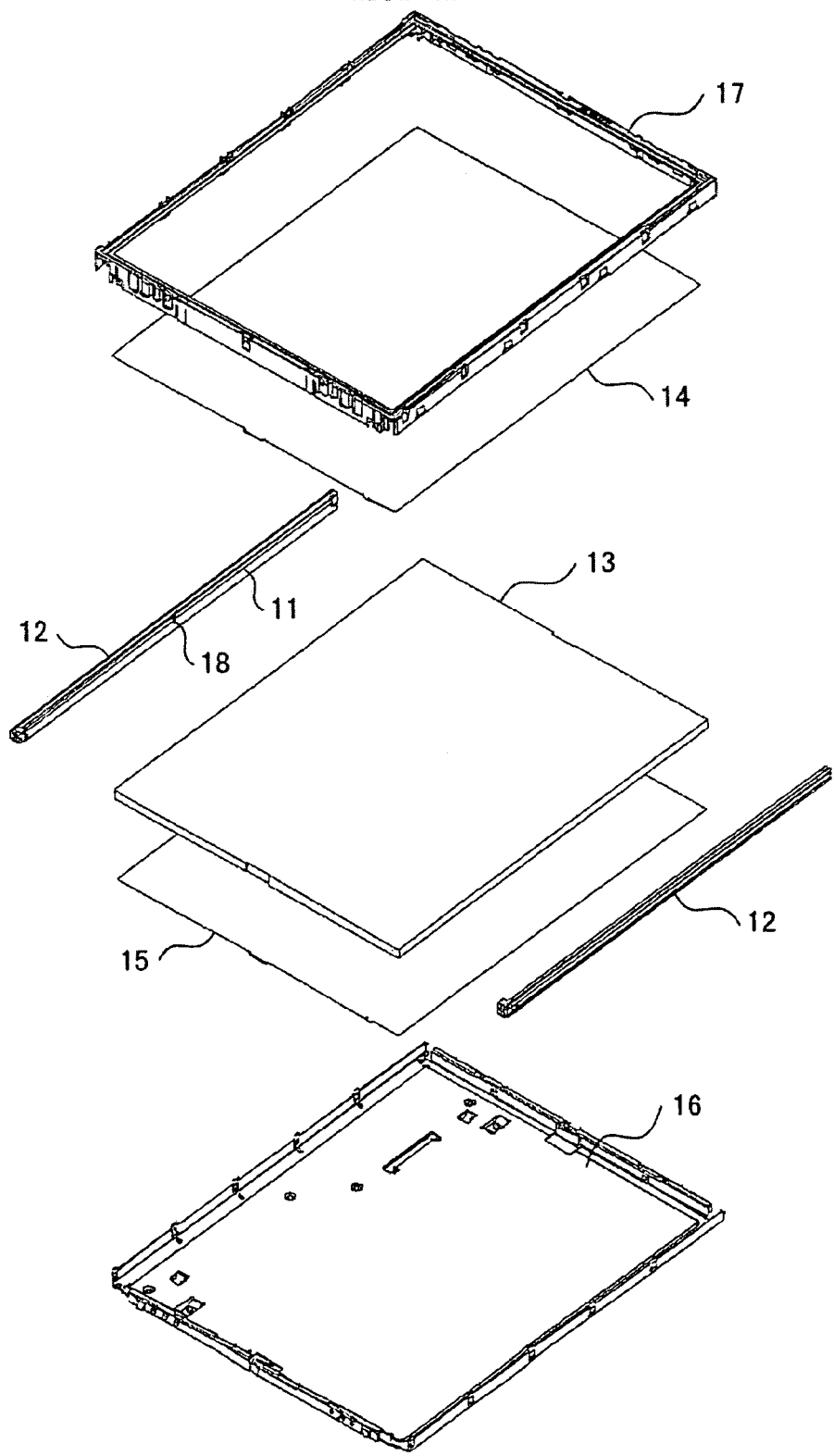
FIG. 1 is an exploded perspective view of a conventional backlight device.
Figure 2:
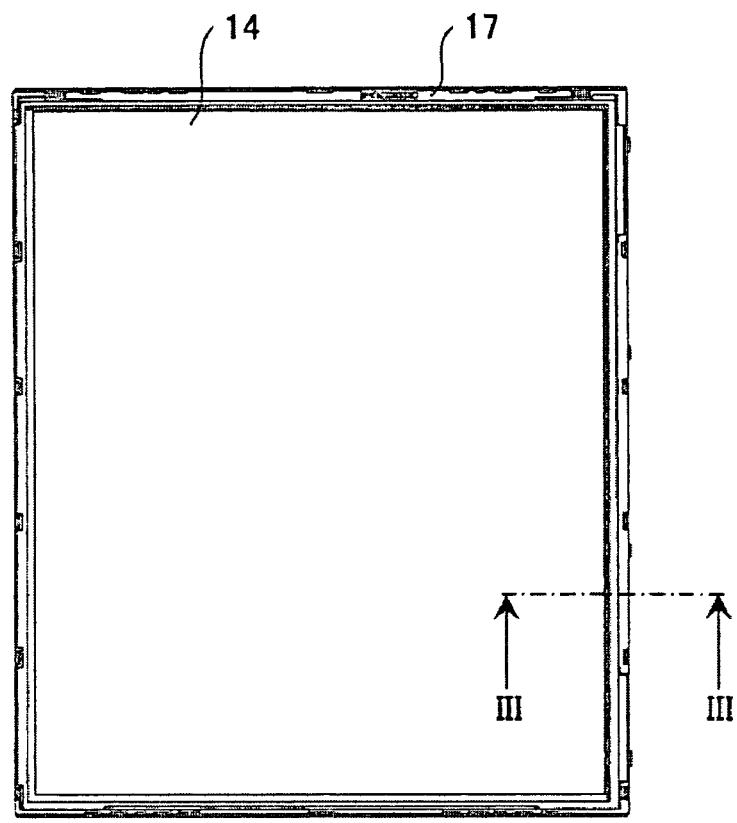
FIG. 2 is a plan view of the backlight device shown in FIG. 1.
Figure 3:
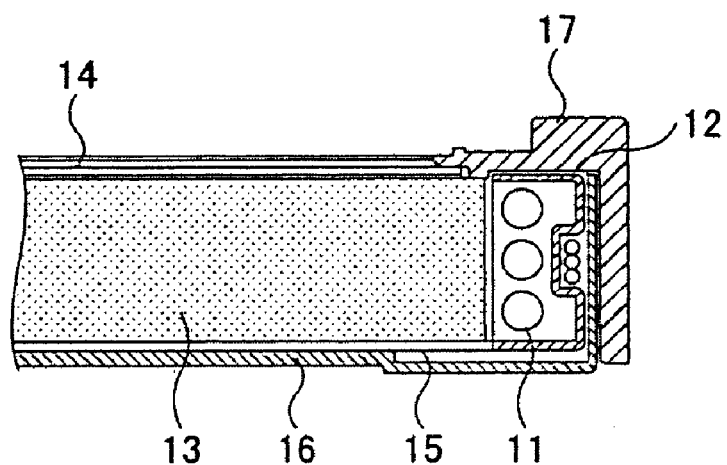
FIG. 3 is an enlarged cross-sectional view taken along a line III-III in FIG. 2.

The backlight device according to the first embodiment of the present invention shown in FIG. 4 differs from the backlight device shown in FIG. 1 in that a reflector 12A is processed. Light is uniformly emitted from the surface of the diffusion plate 14 shown in FIG. 4 so as to illuminate a liquid crystal panel (not shown in the figure) arranged on the frame 17.

Figure 6:
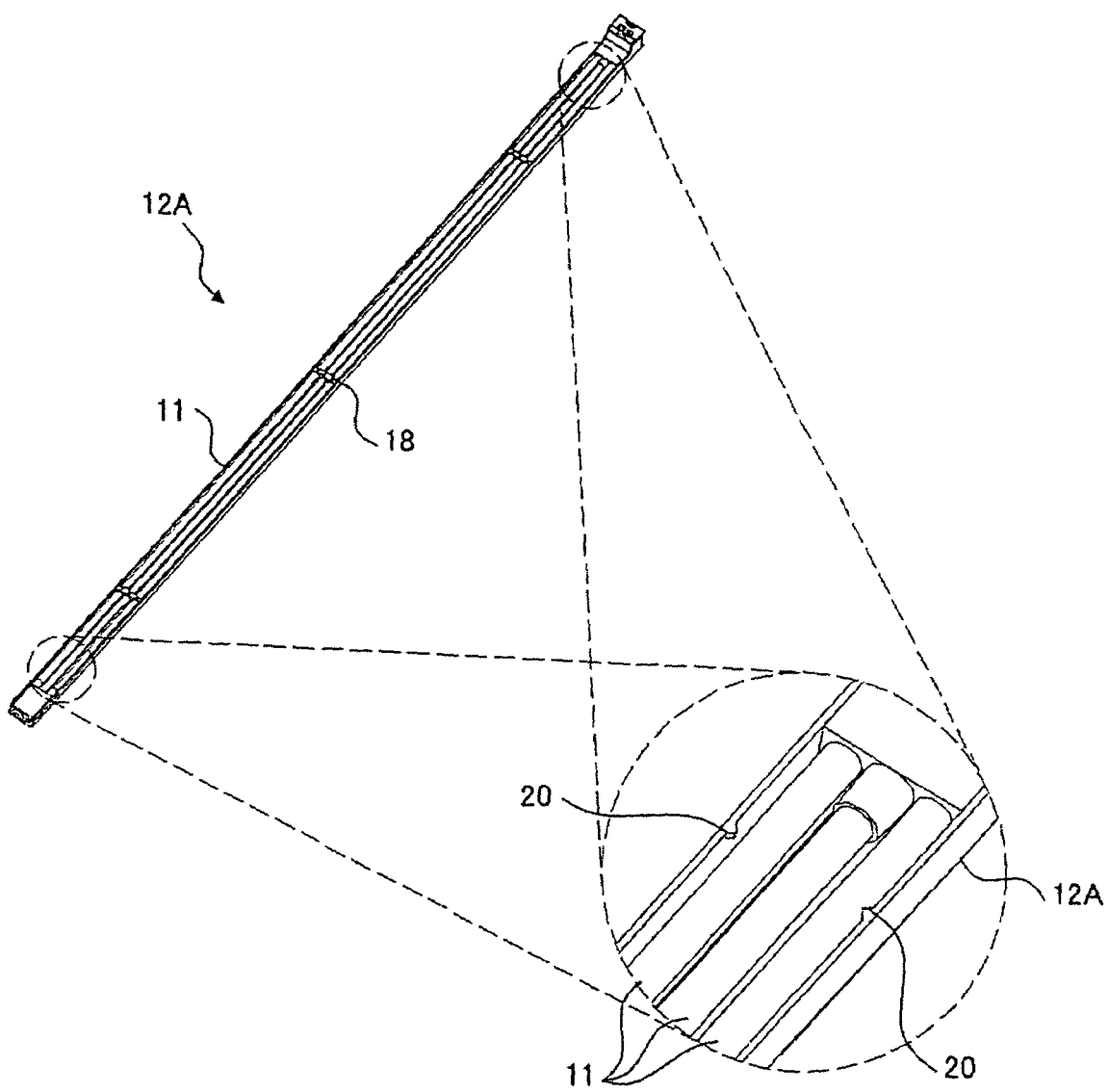
FIG. 6 is a perspective view of a reflector provided in the backlight device according to the first embodiment of the present invention.

In the present embodiment, as shown in FIG. 5 and FIG. 6, minute protruding parts 20 are formed in parts of the rim of the opening part of the reflector 12A. It should be noted that FIG. 6 is a perspective view of the reflector 12A according to the first embodiment of the present invention, in which an enlarged view of the part forming the protruding parts 20 is shown together.

The protruding parts 20 are formed to protrude inward at the edge of the opening part in portions near both ends of the reflector 12A in a longitudinal direction. The protruding direction of the protruding parts 20 is a direction parallel to the side surface of the light-guiding plate 13. The reflector 12A is formed of a metal plate such as an aluminum plate which can be formed by sheet-metal processing. A small protruding shape such as the protruding part 20 can be formed easily by driving a wedge-shaped jig from outside.

As shown in FIG. 5, a distance D between the side walls of the reflector 12A is equal to or greater than a thickness T of the light-guiding plate 13 so that an opening area through which light from the fluorescent tubes 11 passes is acquired sufficiently. However, in such as structure, there is a possibility of the light-guiding plate 13 entering from the opening part of the reflector 12A and contacting with the fluorescent tubes 11. Thus, according to the present embodiment, by providing the protruding parts 20, the distance D1 between the protruding parts 20 in the portion where the protruding pats 20 are provided is made smaller than the thickness T of the light-guiding plate 13. Thereby, the light-guiding plate 13 is in a state where it is in contact with the protruding parts 20, and cannot enter inside the reflector 12A, and the light-guiding plate 13 is prevented from being brought into contact with the fluorescent tubes 11.

The protruding parts 20 protrude inside the opening part of the reflector 12A. Thereby the opening area of the opening part is reduced, but the area occupied by the protruding parts 20 is an extremely small area which can be neglected with respect to the opening area. Thus, a reduction in luminance due to the protruding parts 20 is as small as it can be disregarded.

Although the protruding parts 20 are provided opposite with each other at the same position on both side walls of the reflector 12A in the present embodiment, it is not always necessary to provide two pieces of protruding parts 20 opposite to each other. The protruding parts 20 may be provided at different positions in the longitudinal direction of the reflector 12A. Additionally, at least one protruding part 20 may be provided on one of the sidewalls of the reflector 12A. Further, the protruding parts 20 may be provided at arbitrary positions in the longitudinal direction of the reflector 12A if they are positions opposite to the side surface of the light-guiding plate 13.

Figure 7:
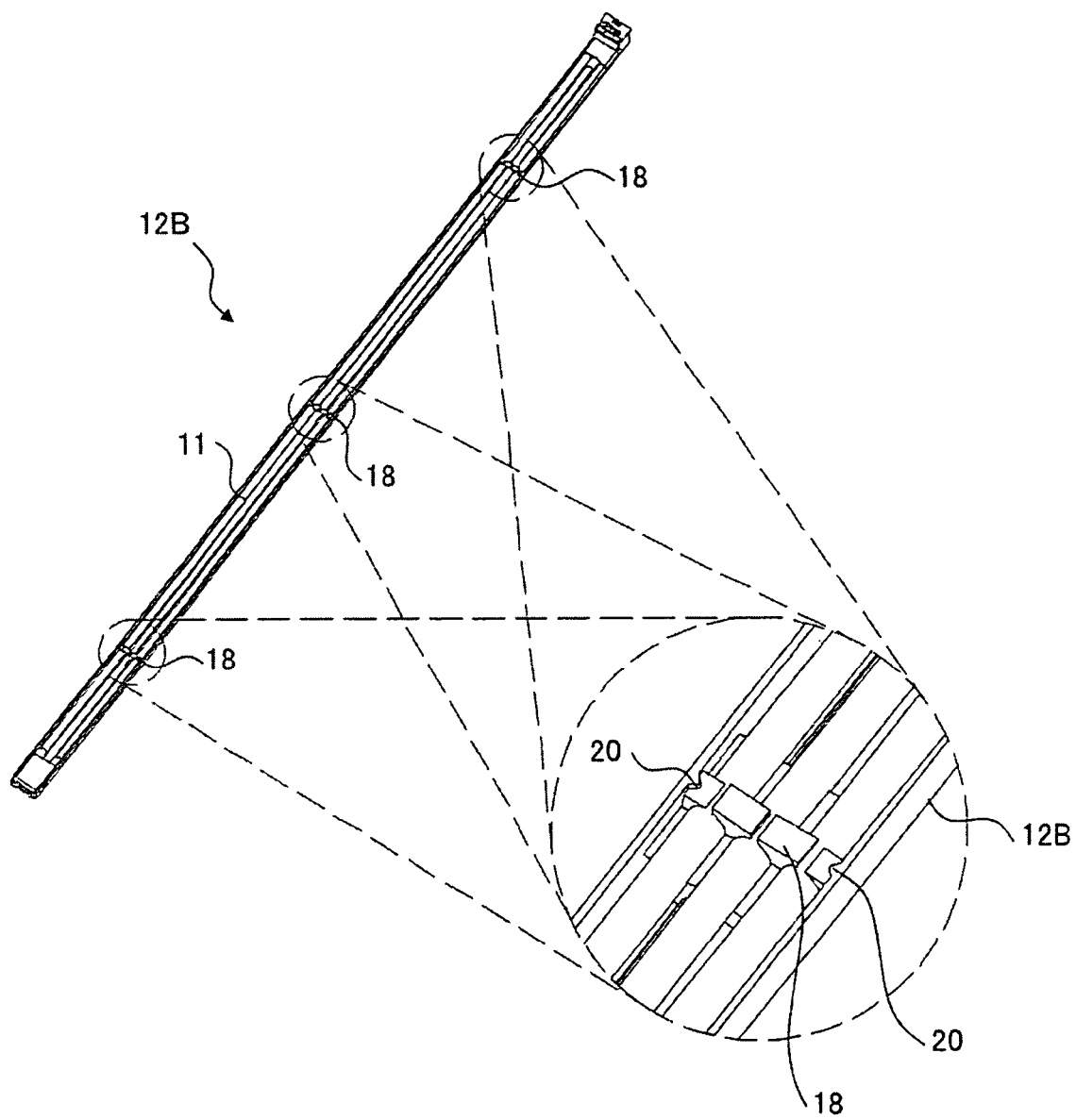
FIG. 7 is a perspective view of a reflector provided in a backlight device according to a second embodiment of the present invention.

Next, a description will be given, with reference to FIG. 7, of a second embodiment of the present invention. FIG. 7 is a perspective view of a reflector 12B provided in a backlight device according to the second embodiment of the present invention. In FIG. 7, an enlarged view of a portion (encircled by a dashed line) provided with the holding members 18 is shown together.

As shown in FIG. 7, in the present embodiment, the protruding parts 20 are provided at positions where the holding members 18 are attached. The holding members 18 are members located between the reflector 12B and the fluorescent tubes 11 so as to hold the fluorescent tubes 11 so that the fluorescent tubes 11 do not move in the reflector 12B. The holding members 18 are formed of silicon rubber having a thickness of, for example, 1.0 mm.

The holding members 18 are parts attached to the reflector 12B originally, and they interrupt light. Thus, the area occupied by the holding members 18 is not included in the opening area of the reflector 12B. Accordingly, by providing the protruding parts 20 in the portions where the holding members 18 are provided, the influence given from the protruding parts 20 to the opening area can be completely eliminated.

Additionally, the contact area is increased by the contact between the protruding parts 20 and the holding members 18, which can cause an increase in an amount of heat transmitted from the fluorescent tubes 11 to the reflector 12B through the holding members 18. Thereby, a cooling effect of the fluorescent tubes 11 by the reflector 12B can be increased.

As mentioned above, according to the present embodiment, by providing the protruding parts 20, the distance between the protruding parts 20 is made smaller than the thickness of the light-guiding plate 13 in the portions where the protruding parts 20 are provided. Thereby, the light-guiding plate 13 is in the state where it is brought into contact with the protruding parts 20, and cannot enter inside the reflector further, and the light-guiding plate 13 is prevented from contacting with the fluorescent tubes 11. Additionally, by providing the protruding parts 20 in the portions where the holding members 18 are attached, heat from the fluorescent tubes 11 can be efficiently transmitted to the reflector 12B, which can increase the cooling effect.

Here, when incorporating the reflector 12B into the backside cover 16, normally, the reflector 12B is inserted between the sidewall of the backside cover 16 and the light-guiding plate 13 from one end side thereof. Accordingly, the protruding parts 20 formed on the opening edge portion of the reflector 12B slide on the side surface of the frame 17 or the light-guiding plate 13. Accordingly, it is preferable to apply a coating process to the protruding parts 20 to reduce a friction resistance.

Figure 8:
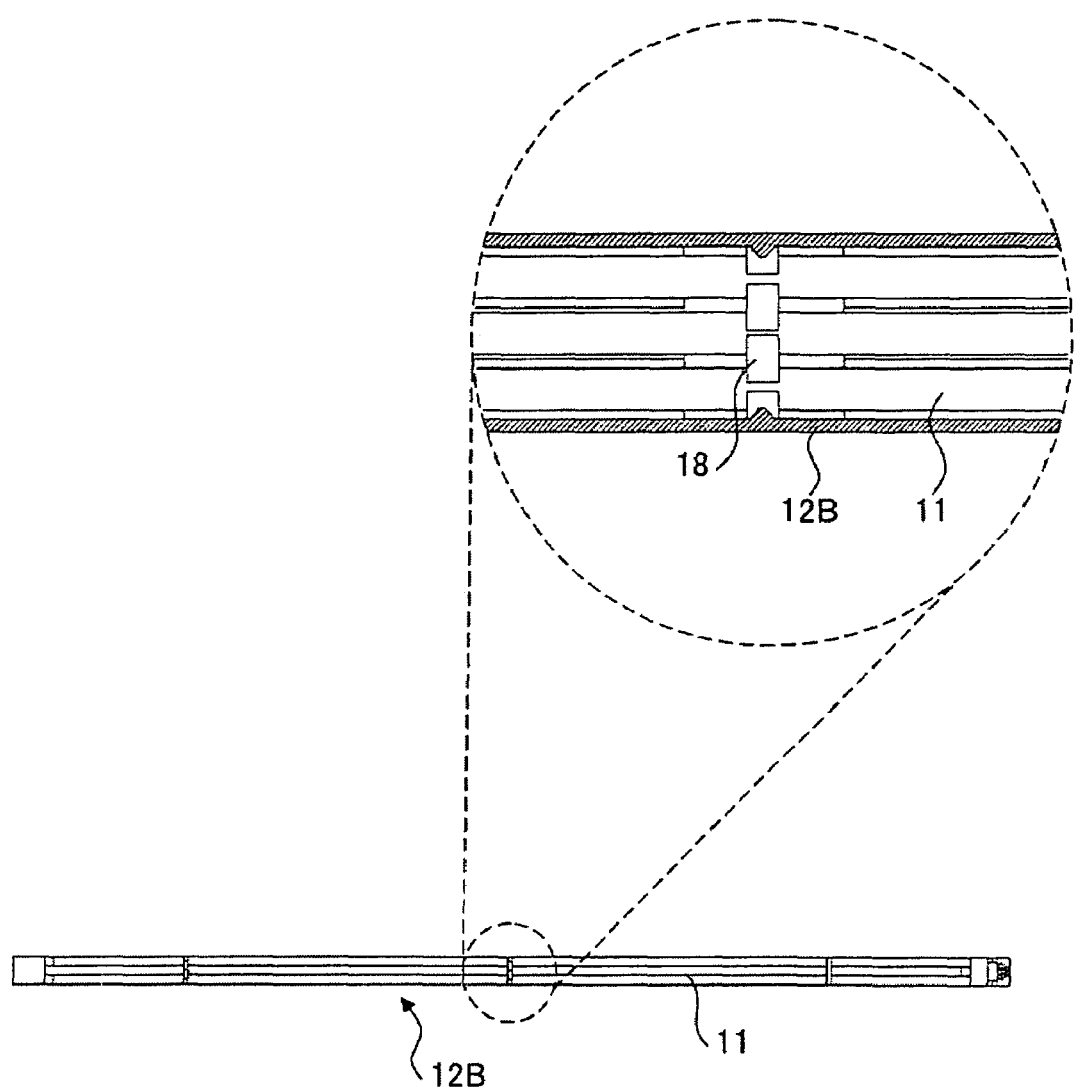
FIG. 8 is a plan view of the reflector to which a coating process is applied.

FIG. 8 is a plan view of the reflector 12B to which a coating process is applied, a portion (a portion encircled by a dashed line) being shown in enlargement. The reflector 12B shown in FIG. 8 is applied with a coating to reduce a friction on not only the protruding parts 20 but also an entire outer surface thereof. The coating is hatched portions in the enlarged view in FIG. 8. As for the coating, it is preferable to use a fluorocarbon resin ($\mu=0.05$) or a Teflon (registered trademark) resin ($\mu=0.04-0.05$) having a coefficient of friction much smaller than the coefficient of friction $\mu=0.3-0.5$ of the material of the reflector 12B such as, for example, an aluminum plate.

The above-mentioned coating process is not limited to the present embodiment, and applicable to the reflector 12A according to the above-mentioned first embodiment.

The present invention is not limited to the specifically disclosed embodiments, and variations and modifications may be made without departing from the scope of the present invention.

The present application is based on Japanese priority application No. 2005-157582 filed May 30, 2005, the entire contents of which are hereby incorporated herein by reference.

What is claimed is:

1. A backlight device configured to be incorporated into a liquid crystal display device, comprising:
    a light-guiding plate emitting a light, which is incident on a side surface thereof, from a front surface; and
    a reflector arranged along the side surface of the light-guiding plate so as to reflect a light from a light source accommodated inside thereof and guide the light to said side surface of said light-guiding plate through an opening part; wherein
    at least one protruding part protrudes in a direction parallel to the side surface of said light-guiding plate from only a limited portion along an edge part of the opening part of said reflector facing said light-guiding plate;
    said side surface of said light-guiding plate is brought into contact with said protruding part of said reflector when said light-guiding plate moves toward said; and
    said reflector has a holding member formed of an elastic material and arranged to fix said light source, and said protruding member is provided in a portion where the holding member is attached and said protruding member is in contact with and embedded into said holding member.

2. The backlight device as claimed in claim 1, wherein said reflector is formed of a metal plate, and said protruding part is formed by deforming the metal plate.

3. The backlight device as claimed in claim 1, wherein a coat is applied on a surface of said protruding part facing said light-guiding plate, the coat having a coefficient of friction smaller than that of said reflector.

4. The backlight device as claimed in claim 1, wherein a coat is applied on a surface of said protruding part facing said light-guiding plate, the coat having a coefficient of friction smaller than that of said reflector.

5. The backlight device as claimed in claim 1, wherein a coat is applied on a surface of said protruding part facing said light-guiding plate, the coat having a coefficient of friction smaller than that of said reflector.

6. A liquid display device comprising:
    a backlight device; and
    a liquid crystal panel arranged on the backlight device,
    wherein said backlight device includes:
    a light-guiding plate emitting a light, which is incident on a side surface thereof, from a front surface; and
    a reflector arranged along the side surface of the light-guiding plate so as to reflect a light from a light source accommodated inside thereof and guide the light to said side surface of said light-guiding plate through an opening part; wherein
    wherein at least one protruding part protrudes in a direction parallel to the side surface of said light-guiding plate from only a limited portion along an edge part of the opening part of said reflector facing said light-guiding plate;
    said side surface of said light-guiding plate is brought into contact with said protruding part of said reflector when said light-guiding plate moves toward said; and
    said reflector has a holding member formed of an elastic material and arranged to fix said light source, and said protruding member is provided in a portion where the holding member is attached and said protruding member is in contact with and embedded into said holding member.

7. The liquid crystal display device as claimed in claim 6, wherein said reflector is formed of a metal plate, and said protruding part is formed by deforming the metal plate.

8. The liquid crystal display device as claimed in claim 6, wherein a coat is applied on a surface of said protruding part facing said light-guiding plate, the coat having a coefficient of friction smaller than that of said reflector.

9. The liquid crystal display device as claimed in claim 6, wherein a coat is applied on a surface of said protruding part facing said light-guiding plate, the coat having a coefficient of friction smaller than that of said reflector.

10. The liquid crystal display device as claimed in claim 6, wherein a coat is applied on a surface of said protruding part facing said light-guiding plate, the coat having a coefficient of friction smaller than that of said reflector.

* * * * *